United States Patent
De Almeida et al.

(10) Patent No.: US 11,241,683 B2
(45) Date of Patent: Feb. 8, 2022

(54) PROCESS FOR PREPARING AN IRON-CHROMIUM CATALYST WITH A PLATINUM PROMOTER, AND CATALYST CONSISTING OF IRON CHROMIUM WITH A PLATINUM PROMOTER

(71) Applicants: PETRÓLEO BRASILEIRO S.A.—PETROBRAS, Rio de Janeiro (BR); UNIVERSIDADE FEDERAL FLUMINENSE—UFF, Niterói (BR)

(72) Inventors: Luis Eduardo Terra De Almeida, Nova Iguaçu (BR); Ludmila De Paula Cabral Silva, Niterói (BR); Ana Carla da Silveira Lomba Sant'ana Coutinho, Niterói (BR); Fabio Barboza Passos, Rio de Janeiro (BR); Vivian Passos De Souza, Rio de Janeiro (BR); Maira Andrade Rodrigues, Rio de Janeiro (BR); Amanda De Almeida Dumani Dos Santos, Rio de Janeiro (BR)

(73) Assignees: PETRÓLEO BRASILEIRO S.A.—PETROBRAS, Rio de Janeiro (BR); UNIVERSIDADE FEDERAL FLUMINENSE—UFF, Rio de Janeiro (BR)

(*) Notice: Subject to any disclaimer, the term of this patent is extended or adjusted under 35 U.S.C. 154(b) by 158 days.

(21) Appl. No.: 15/723,685

(22) Filed: Oct. 3, 2017

(65) Prior Publication Data
US 2018/0093261 A1    Apr. 5, 2018

(30) Foreign Application Priority Data
Oct. 3, 2016 (BR) .......................... 102016022962-6

(51) Int. Cl.
*B01J 37/03* (2006.01)
*B01J 23/89* (2006.01)
(Continued)

(52) U.S. Cl.
CPC .......... *B01J 37/03* (2013.01); *B01J 23/8993* (2013.01); *B01J 37/031* (2013.01); *C01B 3/16* (2013.01);
(Continued)

(58) Field of Classification Search
CPC ...... B01J 23/8993; B01J 37/03; B01J 37/031; C01G 37/02; C01G 49/06
See application file for complete search history.

(56) References Cited

U.S. PATENT DOCUMENTS 2,951,816 A * 9/1960 Banks ...................... B01J 23/26
 502/256
3,518,206 A * 6/1970 Stiles ................... B01J 23/8472
 502/174

(Continued)

OTHER PUBLICATIONS

Yun Lei, "Novel $Fe_2O_3$—$Cr_2O_3$ catalyst for high temperature water gas shift reaction" Doctoral Thesis, University of South Wales, Australia. pp. i-xx; 1-277. (Year: 2005).*

*Primary Examiner* — Cam N. Nguyen
(74) *Attorney, Agent, or Firm* — Sughrue Mion, PLLC

(57) ABSTRACT

The present invention relates to catalysts of iron and chromium with a platinum promoter for use in water-gas shift reactions, both at low temperatures (LTS) and at high temperatures (HTS). Their characteristics of higher activity due to the addition of Pt compared to the conventional catalysts make them superior to the commercial catalysts in the same operating conditions. Because precursors of the active phase ($Fe_3O_4$) are obtained in greater quantity per unit area, it was possible to prepare catalysts that are more promising with a smaller surface area.

20 Claims, 1 Drawing Sheet

(51) Int. Cl.
*C01G 37/02* (2006.01)
*C01G 49/06* (2006.01)
*C01B 3/16* (2006.01)
*C01B 21/48* (2006.01)

(52) U.S. Cl.
CPC ............ *C01G 37/02* (2013.01); *C01G 49/06* (2013.01); *C01B 21/48* (2013.01); *C01P 2002/85* (2013.01); *C01P 2006/12* (2013.01); *C01P 2006/14* (2013.01); *C01P 2006/16* (2013.01); *Y02P 20/52* (2015.11)

(56) References Cited

U.S. PATENT DOCUMENTS

| | | | | |
|---|---|---|---|---|
| 3,658,724 | A * | 4/1972 | Stiles | B01D 53/86 502/180 |
| 4,029,602 | A * | 6/1977 | Risse | B01J 23/64 502/241 |
| 4,071,472 | A * | 1/1978 | Senes | B01D 53/8628 423/239.1 |
| 4,105,590 | A * | 8/1978 | Koberstein | B01D 53/945 423/213.5 |
| 4,294,726 | A * | 10/1981 | Bozon | B01D 53/945 502/304 |
| 4,492,769 | A * | 1/1985 | Blanchard | B01D 53/945 423/213.5 |
| 4,920,088 | A * | 4/1990 | Kolts | B01J 23/40 502/326 |
| 6,177,602 | B1 * | 1/2001 | Williams | B01J 23/894 585/444 |
| 6,191,065 | B1 * | 2/2001 | Williams | B01J 23/8993 502/300 |
| 6,242,379 | B1 * | 6/2001 | Williams | B01J 23/894 502/237 |
| 6,465,704 | B2 * | 10/2002 | Williams | B01J 23/8993 585/444 |
| 6,756,339 | B1 * | 6/2004 | Rokicki | B01J 23/894 502/304 |
| 7,037,876 | B2 * | 5/2006 | O'Brien | B01J 19/0093 502/305 |
| 7,271,126 | B2 * | 9/2007 | Smith | B01J 23/002 502/104 |
| 7,744,849 | B2 | 6/2010 | Hagemeyer et al. | |
| 7,824,455 | B2 | 11/2010 | Faur-Ghenciu et al. | |
| 8,003,837 | B2 * | 8/2011 | Walsdorff | B01J 23/745 502/336 |
| 9,884,314 | B2 * | 2/2018 | Luo | C07C 5/3337 |
| 2005/0191224 | A1 | 9/2005 | Endou | |

* cited by examiner

PROCESS FOR PREPARING AN IRON-CHROMIUM CATALYST WITH A PLATINUM PROMOTER, AND CATALYST CONSISTING OF IRON CHROMIUM WITH A PLATINUM PROMOTER

CROSS-REFERENCE TO RELATED APPLICATION

This application claims the benefit of priority to BR 10 2016 022962-6, filed 3 Oct. 2016, which is incorporated herein by reference in its entirety.

FIELD OF THE INVENTION

The present invention relates to catalysts of iron and chromium with a platinum promoter for use in water-gas shift reactions and to the process for preparing these catalysts.

BACKGROUND OF THE INVENTION

The need for better exploitation of heavy petroleum fractions makes gasification an interesting alternative technology. The trend towards using heavy oils as feedstock to be processed in refineries results in higher yields of residues of lower added value, such as fuel oil and coke. The use of gasification technology in an integrated refinery system makes it possible to maximize the output of hydrogen, increasing the overall efficiency of the refinery.

Gasification of refinery residues has some particular features compared to coal gasification. The low-cost synthesis gas obtained as an intermediate can be used for producing hydrogen, methane and other compounds. The synthesis gas produced by gasification has an extremely high carbon monoxide/hydrogen ratio ($CO/H_2$), so that when it is used for producing products other than hydrogen, the $CO/H_2$ ratio must be adjusted using the water-gas shift reaction (WGSR).

Another important aspect of reduction of the $CO/H_2$ molar ratio relates to the activity of the catalysts of subsequent processes, as they are deactivated or their activity is reduced in the presence of excess CO. In this way the water-gas shift reaction increases the useful life of the catalysts used in various industrial processes, such as in ammonia synthesis and hydrogenation reactions.

At present the commonest method for producing hydrogen is steam reforming of hydrocarbons, mainly methane, the product being a mixture of carbon monoxide (CO), hydrogen gas ($H_2$), carbon dioxide ($CO_2$) and unconverted reactant. With the aim of increasing the production of hydrogen, oxidation of the carbon monoxide is carried out by the water-gas shift reaction. In this reaction, steam reacts in the presence of a catalyst with carbon monoxide, which is then oxidized to carbon dioxide, generating an additional quantity of hydrogen:

$$CO+H_2O \rightleftharpoons CO_2+H_2$$

The water-gas shift reaction is sufficiently well known from the prior art. It became one of the most important catalytic reactions in 1915, when the first plant for ammonia synthesis based on coal was developed. The water-gas shift reaction (WGSR) is an important step in the processing of synthesis gas derived from coal, both for purification in the production of hydrogen, and for adjusting the $CO/H_2$ molar ratio for production of fuel from synthesis gas.

Industrially, the water-gas shift reaction (WGSR) is usually carried out in two steps, one at low temperatures, between 200-250° C., called low-temperature shift (LTS) and the other at higher temperatures, in the range 310-450° C., called high-temperature shift (HTS).

The typical catalyst for HTS, consisting of $Fe_3O_4$ and $Cr_2O_3$, has been used since the first commercial process developed by BASF in 1915. However, it has undergone modifications over time to optimize its stability. The active phase of the catalyst is magnetite ($Fe_3O_4$) and the role of $Cr_2O_3$ is to prevent sintering of the crystallites of $Fe_3O_4$, and consequent loss of active surface area. The fresh catalyst contains 90-95% of haematite ($Fe_2O_3$), with 5-10% of $Cr_2O_3$, depending on the manufacturer. The catalyst is activated by controlled reduction of $Fe_2O_3$ to $Fe_3O_4$. Reduction is performed with $H_2$ and CO present in the reactor feed, in the presence of $H_2O$ and $CO_2$, avoiding additional reduction to FeO and metallic Fe:

$$3Fe_2O_3+H_2 \rightleftharpoons 2Fe_3O_4+H_2O$$

$$3Fe_2O_3+CO \rightleftharpoons 2Fe_3O_4+CO_2$$

The equilibrium between the phases $Fe_2O_3$ and $Fe_3O_4$ is determined by the ratios of $H_2/H_2O$ and $CO/CO_2$. It is important to emphasize that the reduction cannot be performed in the traditional manner using pure $H_2$ or mixtures of $H_2$ and $N_2$ so as to prevent the formation of metallic Fe. Any formation of metallic FE would catalyse the methanation reaction and the Boudouard reaction (disproportionation of CO), leading to the formation of coke:

$$CO+3H_2 \rightleftharpoons CH_4+H_2O$$

$$2CO \rightleftharpoons C+CO_2$$

From the thermodynamic perspective, the efficiency of the water-gas shift reaction is maximized at low temperatures, high concentration of water and low concentration of hydrogen. However, under certain conditions, the existing catalysts are limited kinetically at the low temperatures necessary for high conversion of CO. These catalysts also have many disadvantages such as low activity and sensitivity to air at low temperature. This means, for practical purposes, that the process is carried out at high temperatures or using reactors of large volume.

Thus, in one of the configurations of the process the first stage of the reaction is a high-temperature converter followed by a low-temperature converter. The high-temperature step is usually carried out in a range from 320 to 450° C., using an Fe oxide-Cr catalyst at a total pressure that varies from 10 to 60 bar. In normal operating conditions, the temperature in the converter bed rises continuously, and may reach 500° C. The high-temperature water-gas shift reaction employs catalysts based on iron owing to their excellent thermal stability, resistance to poisoning and good selectivity.

The low-temperature step is carried out between 200 and 250° C., and the catalysts most used are $Cu/ZnO/Al_2O_3$. The concentration of carbon monoxide in this step may vary from 1 to 5%. The outlet temperatures may reach 280° C. and the CO is reduced to amounts below 0.5%. The $Cu/ZnO/Al_2O_3$ catalysts are more sensitive to the presence of poisons, such as sulphur and chlorides, but possess higher activity at low temperature.

Precious metal catalysts have proved to be attractive alternatives for the water-gas shift reaction, since they are more active than those of Fe—Cr and are generally more tolerant to poisoning by sulphur. Some authors used platinum for preparing catalysts in their investigations, and observed a certain tolerance of this metal to the presence of sulphur. This was explained by the low stability of the bond between sulphur and platinum.

U.S. Pat. No. 7,744,849 discloses a catalyst for the water-gas shift reaction comprising a platinum-based catalyst, with at least one alkaline earth metal and at least one third metal. Specifically, the catalyst in this patent comprises: a) Pt, b) at least one of Li, Na, K, Rb, Cs, Mg, Ca, Sr, Ba and c) at least one of Sc, Y, Ti, Zr, V, Nb, Ta, Cr, Mo, W, Mn, Fe, Co, Ir, Ni, Pd, La, Ce, Pr, Nd, Sm, Eu.

Patent application US 2005/0191224 discloses a catalyst for conversion of CO to carbon dioxide ($CO_2$) by means of a water-gas shift reaction. The catalyst includes a support formed from a metal oxide, a platinum component and an alkali metal component supported on this support. Examples of catalysts disclosed in this application include $Na/Pt/ZrO_2$, $K/Pt/ZrO_2$ and $Rb/Pt/ZrO_2$.

U.S. Pat. No. 7,824,455 describes the application of a precious metal catalyst of Pt, Pd or mixtures thereof, or else mixtures of Pt—Ir for the water-gas shift reaction in the temperature range 200-400° C., supported on a mixture of oxides of Ce and Zr, with Ce in the range 20-58% or 58-80% and Zr in the range 42-20%, with, as promoter, at least one metal selected from yttrium, alkali metals or alkaline earth metals in the range 0.01-1%.

A platinum-based iron-chromium catalyst for use in aqueous-phase reforming of ethylene glycol was disclosed in the article *Preparation and catalytic properties of Pt supported Fe-Cr mixed oxide catalysts in the aqueous-phase reforming of ethylene glycol, Catalysis Communications,* 9, 2316-2318, by Liu, X. H., Shen, K., Wang, Y. G., et al., 2008. However, the catalyst is prepared by decomposition of nitrates using citric acid as fuel, which makes it unattractive for industrial production, since it involves the use of a reagent of relatively high cost (citric acid) and it is very difficult to control the reaction temperature. Table 1 in that article discloses that the preferred catalyst has a high specific surface area, of 94 $m^2/g$.

However, despite the current developments, the technique still needs an Fe—Cr catalyst with Pt promoter that can be applied to the water-gas shift reactions in all the technologies in which this reaction is used, such as steam reforming, partial oxidation and catalytic gasification.

SUMMARY OF THE INVENTION

The present disclosure relates to iron-chromium catalysts with a platinum promoter. These catalysts can be applied in water-gas shift reactions in HTS and LTS. Their activity characteristics, which are higher due to the addition of Pt compared to the conventional catalysts, make them superior to the commercial catalysts in the same operating conditions. Because precursors of the active phase ($Fe_3O_4$) are obtained in greater quantity per surface area, it was possible to prepare catalysts with high activity and with a smaller area.

In addition, the process for preparing these iron-chromium catalysts with a platinum promoter is described.

One aspect of the present disclosure provides a process for preparing an iron-chromium catalyst with a platinum promoter, wherein the process comprises the following steps: (a) synthesis of the iron and chromium oxides by the method of co-precipitation so as to obtain Fe2O3 and Cr2O3; and (b) addition of platinum to the catalyst obtained in (a). Another aspect of the invention provides a catalyst obtained by the process.

Another aspect of the present disclosure provides a process for preparing an iron-chromium catalyst with a platinum promoter, characterized in that it comprises at least some of the following steps: (a) synthesis of the iron and chromium oxides by the method of co-precipitation so as to obtain $Fe_2O_3/Cr_2O_3$ in a ratio of 85-95%:15-5%; (b) addition of between 0.01 and 1.5 wt % of platinum to the catalyst obtained in (a) by the method of dry impregnation; and (c) drying at a temperature varying between 110 to 130° C. for 20 to 28 hours.

In some aspects, the process is further characterized in that it additionally comprises the step of calcination of the catalyst at a temperature varying from 440 to 460° C. for 1 to 3 hours, with a heating rate varying from 5 to 15° C./min.

In some aspects, the process is further characterized in that the iron and chromium oxides are synthesized from $Fe(NO_3)_3.9H_2O$ and $Cr(NO_3)_3.9H_2O$, respectively, at a temperature varying between 60 and 80° C.

In some aspects, the process is further characterized in that a base is added until the solution reaches pH between 8.0 and 9.0 in the step of synthesis of Fe—Cr.

In some aspects, the process is further characterized in that the base is $Na_2CO_3$.

In some aspects, the process is further characterized in that the iron-chromium catalyst is matured for 1 to 10 hours.

In some aspects, the process is further characterized in that the platinum precursor is hexachloroplatinic acid.

In another aspect of the present disclosure, there is provided a catalyst consisting of iron-chromium with a platinum promoter obtained by the process as defined in any one of the preceding aspects, and further characterized in that it has a specific surface area between 35 and 45 $m^2.g^{-1}$.

In some aspects, the catalyst is further characterized in that it is suitable for use in water-gas shift reactions in LTS and HTS.

In some aspects, the catalyst is further characterized in that it is suitable for use in water-gas shift reactions in the temperature range of 200 to 450° C.

DETAILED DESCRIPTION OF THE INVENTION

Figure 1:
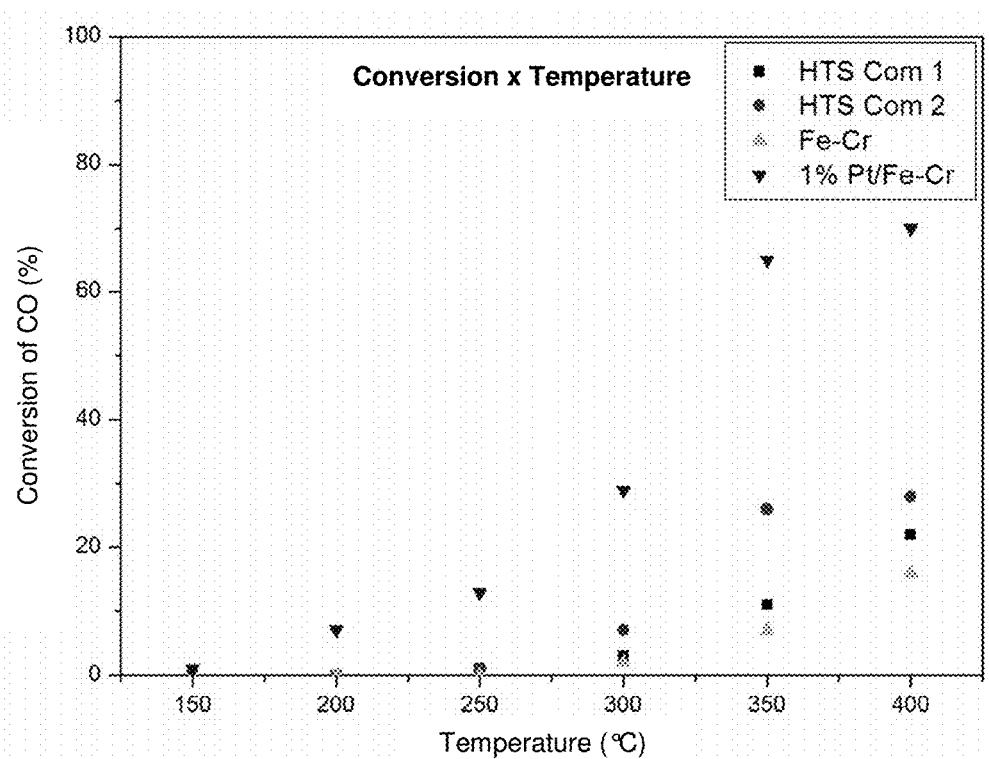
FIG. 1 shows a diagram of the conversion of CO carried out with commercial catalysts and with the catalysts according to the present disclosure in a range varying from 150° C. to 400° C.

The Fe—Cr catalysts with Pt promoter of the present disclosure can be applied to the water-gas shift reactions in all the technologies in which this reaction is used, such as steam reforming, partial oxidation and catalytic gasification. Their higher activity makes them superior to the commercial catalysts in the same operating conditions.

Depending on the support used, catalysts with a platinum promoter are active in the water-gas shift reaction. Interaction of Pt with the components of the Fe—Cr catalyst leads to the formation of additional active sites, improving the activity of the catalyst.

Owing to its activity over a wide temperature range, the catalyst of the present disclosure may be used in conditions from low to high temperature, and is therefore applicable in both low-temperature shift (LTS) and high-temperature shift (HTS) water-gas shift reactions (WGSR).

As described above, the water-gas shift reaction (WGSR) is maximized at low temperatures, high concentration of water and low concentration of hydrogen. However, the existing catalysts are kinetically limited at low temperatures. In practice, processes work at higher temperatures than is indicated by the thermodynamics. With catalysts that are more active, the reaction kinetics are more favourable, the volume of catalyst can be minimized, and it is possible to work at lower temperatures, promoting higher conversions from the thermodynamic standpoint.

The catalyst of the present disclosure is an Fe—Cr catalyst, prepared by the method of co-precipitation from iron and chromium salts such as, for example, $Fe(NO_3)_3 \cdot 9H_2O$ and $Cr(NO_3)_3 \cdot 9H_2O$. In some embodiments, this can be done at a temperature between 60 and 80° C. These reagents can be added to a base until the solution reaches a pH between 8.0 and 9.0, for example. In some embodiments, the base used is $Na_2CO_3$. The precipitate can be matured in these conditions for a period from 1 to 10 hours. It can then be filtered and dried for 10-14 hours at 100-120° C., for example. At the end of preparation, in some embodiments, the catalyst has $Fe_2O_3/Cr_2O_3$ in a weight ratio of 85-95%: 15-5%, respectively. In preferred embodiments, the catalyst has 90% $Fe_2O_3$ 10% $Cr_2O_3$.

In the method of synthesis of the Fe—Cr catalyst of the present disclosure, the iron and chromium oxides are formed at the same time. This promotes the formation of crystals with greater dispersion of the oxides of the species present. This can increase the interactions between the iron and chromium. In addition, the catalyst has a low specific surface area, between 35 and 45 $m^2 \cdot g^{-1}$. This reduces the exposure of the iron oxide sites. This reduced exposure, combined with the better Fe—Cr interaction, promotes the partial reduction of the sites of haematite ($Fe_2O_3$) to magnetite ($Fe_3O_4$), increasing the overall activity of the catalyst.

The Fe—Cr catalysts thus prepared are promoted with platinum by a method of dry impregnation. In some embodiments, the impregnation is in a percentage by weight varying from 0.01 to 1.5%. An example of a platinum precursor is hexachloroplatinic acid. Thus, a solution of $H_2PtCl_6$ can be prepared, and diluted in a volume of water corresponding to the pore volume. This solution can be added slowly to the support, stirring continuously to make the impregnation uniform.

After impregnation, the samples can be subjected to a temperature between 110 and 130° C., at which each sample can remain for a period of time between 20 and 28h. After this time the samples can be calcined by heating with an initial heating rate varying from 5 to 15° C./min to a temperature between 440 and 460° C., and then maintaining the temperature between 440 and 460° C. for 1 to 3 hours.

The method used for adding platinum (dry impregnation) promotes suitable dispersion of the particles on the surface of the support. The presence of platinum promotes the partial reduction of haematite, which occurs at lower temperatures, together with the reduction of platinum oxide and chromium oxides. This reduces the possibility of complete reduction to the metallic form of Fe (which, as explained above, would undesirably catalyse the methanation reaction and the Boudouard reaction, leading to the formation of coke.

Furthermore, in clean conditions, i.e. without the presence of impurities such as sulphur, the catalyst of the present disclosure displays initial conversion of CO in the range from 30 to 40%.

EXAMPLES

Table 1 presents the results obtained for specific surface area ($S_{BET}$) based on the BET method in a w/w range from 0.05 to 0.20, average pore diameter ($D_p$) and total pore volume ($V_p$) of the commercial catalysts (HTS Com 1, HTS Com 2), of the Fe—Cr catalyst and of the Fe—Cr catalyst impregnated with 1% platinum, according to the present disclosure. These experiments were carried out in ASAP 2020 equipment from MICROMERITICS.

TABLE 1

Surface properties of the catalysts

| Catalysts | $S_{BET}$ ($m^2 \cdot g^{-1}$) | $D_p$ (Å) | $V_p$ ($cm^3 \cdot g^{-1}$) |
|---|---|---|---|
| HTS Com 1 | 60.20 | 168.0 | 0.278 |
| HTS Com 2 | 30.10 | 186.3 | 0.148 |
| Fe—Cr | 45.50 | 149.4 | 0.194 |
| 1% Pt/Fe—Cr | 41.10 | 151.4 | 0.176 |

Furthermore, to determine the chemical compositions of the synthesized catalysts, the technique of X-ray spectrometry (EDX) was used, in which the samples are exposed to an X-ray beam under vacuum. The equipment used was a spectrometer of BRUKER make, model S4 Explorer, equipped with a rhodium (Rh) X-ray generating tube.

Table 2 presents the results obtained for determining the chemical composition of the oxides of the catalysts, determined by X-ray fluorescence spectrometry (EDX).

TABLE 2

Composition of the catalysts obtained by X-ray spectrometry

| | Contents of the oxides (%) | | | | | |
|---|---|---|---|---|---|---|
| Catalysts | Pt | Cu | Al | Fe | Cr | Others |
| HTS Com 1 | — | — | — | 89.1 | 8.5 | 1.9 Cu 0.4 Mn |
| HTS Com 2 | — | 3.60 | 0.2 | 84.6 | 8.9 | 2.6 Na 0.06 S |
| Fe-Cr | — | — | — | 90.4 | 9.6 | — |
| 1% Pt/Fe-Cr | 1.10 | — | — | 85.8 | 9.6 | 2.2 Na 1.1 Cl |

Catalytic Tests

The catalytic tests were carried out in a unit coupled to a SHIMADZU gas chromatograph, with a SUPELCO CARBOXEN 1010 PLOT 30 m×0.53 mm column, a thermal conductivity detector (TCD) and a flame ionization detector (FID). A quartz reactor containing approximately 200 mg of sample was used for the reaction.

All the catalysts underwent the same step of drying and activation (shown in Table 3).

TABLE 3

Conditions of drying and activation

| Drying | Flow rate: 30 mL/min of He |
| | Heating rate: 10° C./min up to 150° C., maintained for 30 min |
| Activation | Reaction mixture: 100 mL/min |
| | Heating rate: 10° C./min up to 400° C., maintained for 2 hours |

The various commercial catalysts (HTS Com 1, HTS Com 2), the Fe—Cr catalyst and the Fe—Cr catalyst impregnated with 1% platinum, according to the present disclosure, were submitted to reaction, adopting the conditions shown in Table 4.

TABLE 4

Reaction steps and conditions

| | $H_2$ | CO | $CO_2$ | $H_2O$ | $N_2$ |
|---|---|---|---|---|---|
| Reaction mixture | 5% | 15% | 5% | 20% | 55% |
| Temperatures | 150° C., 200° C., 250° C., 300° C., 350° C. and 400° C. | | | | |
| Stability test | 300° C. for approx. 15 h | | | | |

Results

The results obtained from the tests described above are presented in FIGS. 1 and 2.

FIG. 1 shows a diagram of the effect of temperature on the conversion of CO using commercial catalysts and Fe—Cr supported catalysts. An extremely surprising positive effect is found on incorporating 1% of Pt compared to the Fe—Cr catalyst that is already conventional in the water-gas shift reaction. In these conditions, the 1% Pt/Fe—Cr catalyst displays very interesting potential for application in this reaction.

The Fe—Cr catalyst prepared has an activity profile similar to the commercial catalysts. The use of Pt as a promoter, however, provides activity at lower temperatures, visible in the results from 200° C., a temperature at which the commercial catalysts and the Fe—Cr catalyst without promoter did not display activity, and appearing to start between 150° C. and 200° C.

Moreover, it can be seen that the activity at 350-400° C. of the catalyst with a platinum promoter is more than twice the activity of the catalysts without promoter.

Thus, it can be concluded that the Fe—Cr catalyst with Pt promoter, prepared according to the present disclosure, can be used for water-gas shift reactions in LTS and HTS.

Figure 2:
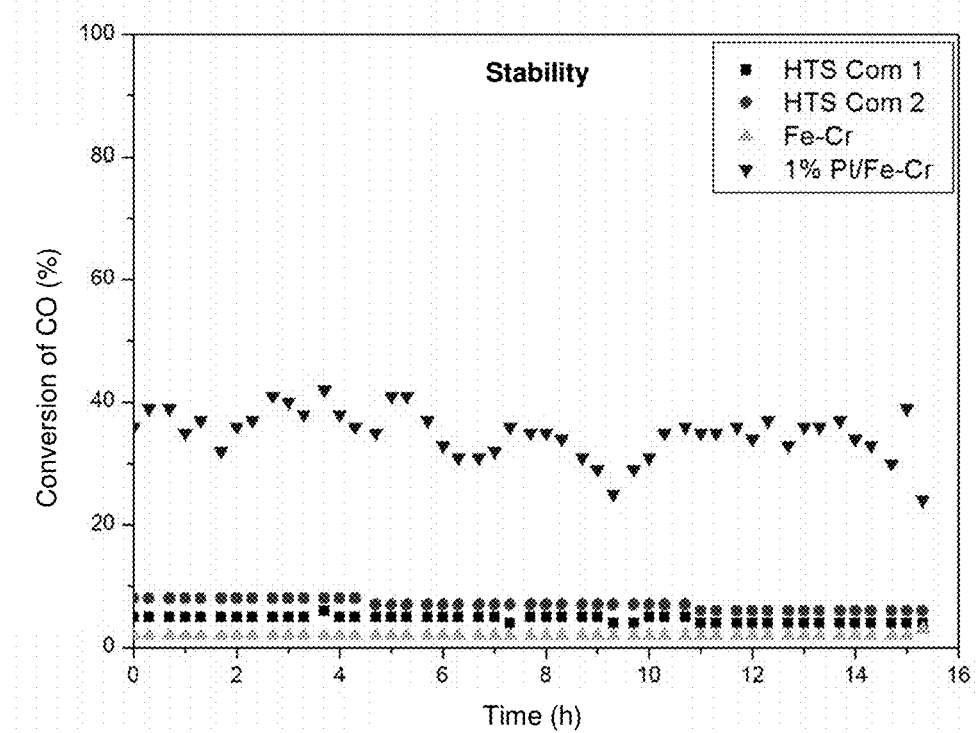
FIG. 2 shows a diagram of the conversion of CO carried out with commercial catalysts and with the catalysts according to the present disclosure at a temperature of 300° C. for 15 hours.

FIG. 2 shows a diagram of stability in conversion of CO for the catalysts tested. As can be seen, there is a slight tendency for deactivation with the reaction time for the commercial catalysts.

Despite the variations in the result (due to condensation of $H_2O$ in the catalytic testing unit), a tendency for conversion at considerable values is observed for the Fe—Cr catalyst with Pt promoter, especially when compared to the conventional Fe—Cr, which indicates great potential for use of this catalyst.

Table 5 below shows a comparison between the various catalysts with respect to conversion of CO in clean conditions, presenting a time average of the results in FIG. 2.

TABLE 5

Comparison of the catalysts with respect to conversion of CO

| Catalyst | Conversion of CO (%) |
|---|---|
| HTS Com 1 | 4.82 |
| HTS Com 2 | 7.95 |
| Fe—Cr | 1.85 |
| 1% Pt/Fe—Cr | 36.70 |

It was found, surprisingly, that in addition to the catalyst of the present disclosure not suffering a significant decrease in catalytic activity, there was a substantial increase in conversion of CO relative to the catalysts known from the prior art. It is thought that this is at least partly due to the method of preparation of the material, which favours the formation of species that are more susceptible to partial reduction, obtaining the active phase ($Fe_3O_4$) in greater quantity per unit of area.

Modification of the above-described apparatuses and methods, combinations between different variations as practicable, and variations of aspects of the invention that are obvious to those of skill in the art are intended to be within the spirit and scope of the claims.

What is claimed is:

1. A process for preparing an iron-chromium water-gas shift reaction catalyst with a platinum promoter, wherein the process consists of the following steps:
   (a) synthesizing iron and chromium oxides by a method of co-precipitation so as to obtain $Fe_2O_3$ and $Cr_2O_3$; and
   (b) adding platinum to the catalyst obtained in (a),
   wherein the process excludes addition of oxides other than iron and chromium oxide.

2. The process according to claim 1, wherein the co-precipitation provides $Fe_2O_3$ and $Cr_2O_3$ in a ratio of 85-95%: 15-5% by weight.

3. The process according to claim 1, wherein the platinum is added in an amount of from 0.01 to 1.5 wt% of the catalyst.

4. The process according to claim 1, wherein the platinum is added by a method of dry impregnation of the catalyst.

5. The process according to claim 1, wherein the iron and chromium oxides are synthesized from $Fe(NO_3)_3.9H_2O$ and $Cr(NO_3)_3.9H_2O$, respectively.

6. The process according to claim 5, wherein the iron and chromium oxides are synthesized at a temperature from 60 to 80° C.

7. The process according to claim 5, wherein a base is added to the solution of $Fe(NO_3)_3.9H_2O$ and $Cr(NO_3)_3.9H_2O$ in the step of synthesis of the iron and chromium oxides.

8. The process according to claim 7, wherein the base is $Na_2CO_3$.

9. The process according to claim 7, wherein the iron-chromium catalyst is matured in the solution containing the base for 1 to 10 hours prior to the step of adding platinum to the catalyst.

10. The process according to claim 1, wherein the addition of the platinum comprises the addition of hexachloroplatinic acid as a platinum precursor.

11. A catalyst consisting of iron-chromium with a platinum promoter prepared by the process as defined in claim 1, wherein the catalyst has a specific surface area between 35 and 45 $m^2.g^{-1}$.

12. The catalyst according to claim 11, wherein the catalyst is used in water-gas shift reactions in both low-temperature shift and high-temperature shift.

13. The catalyst according to claim 11, wherein the catalyst is used in water-gas shift reactions in the temperature range of from 200 to 450° C.

14. The process according to claim 1, wherein the iron-chromium catalyst is filtered and dried for 10-14 hours at 100-120° C. prior to the step of adding platinum to the catalyst.

15. A process for preparing an iron-chromium water-gas shift reaction catalyst with a platinum promoter, wherein the process consists of the following steps:
   (a) synthesizing iron and chromium oxides by a method of co-precipitation so as to obtain $Fe_2O_3$ and $Cr_2O_3$;
   (b) adding platinum to the catalyst obtained in (a), and
   (c) drying at a temperature from 110 to 130° C., wherein the process excludes addition of oxides other than iron and chromium oxide.

16. The process according to claim 15, wherein the step of drying is performed for 20 to 28 hours.

17. A process for preparing an iron-chromium water-gas shift reaction catalyst with a platinum promoter, wherein the process consists of the following steps:
    (a) synthesizing iron and chromium oxides by a method of co-precipitation so as to obtain $Fe_2O_3$ and $Cr_2O_3$;
    (b) adding platinum to the catalyst obtained in (a), and calcinating the catalyst,
    wherein the process excludes addition of oxides other than iron and chromium oxide.

18. The process according to claim 17, wherein the step of calcination is performed at a temperature of from 440 to 460° C.

19. The process according to claim 18, wherein the step of calcination comprises maintaining the temperature between 440 and 460° C. for 1 to 3 hours.

20. The process according to claim 19, wherein the step of calcination comprises an initial heating step, heating at a rate of from 5 to 15° C./min, to reach the temperature of from 440 to 460° C.

\* \* \* \* \*